United States Patent [19]

Kinnard et al.

[11] Patent Number: 4,859,911

[45] Date of Patent: Aug. 22, 1989

[54] POWER SUPPLY FOR ELECTROLUMINESCENT PANEL

[75] Inventors: J. R. Kinnard; Dennis N. Oliver, both of Austin, Tex.

[73] Assignee: International Business Machines Corporation, Armonk, N.Y.

[21] Appl. No.: 273,115

[22] Filed: Nov. 16, 1988

Related U.S. Application Data

[63] Continuation of Ser. No. 14,894, Feb. 13, 1987, abandoned.

[51] Int. Cl.[4] .............................................. G09G 3/10
[52] U.S. Cl. .............................. 315/169.3; 315/169.4; 315/169.2
[58] Field of Search ............... 315/169.3, 169.2, 169.4, 315/307, 242, 244, 291; 340/781, 782

[56] References Cited

U.S. PATENT DOCUMENTS

| | | | |
|---|---|---|---|
| 4,253,097 | 2/1981 | Hochstrate | 340/781 |
| 4,595,920 | 6/1986 | Runyan | 340/805 |
| 4,633,141 | 12/1986 | Weber | 315/169.3 |

FOREIGN PATENT DOCUMENTS 1556450 7/1976 United Kingdom .

OTHER PUBLICATIONS

Application Example for Siemens Integrated Circuit, Part No. TDA 4814 (Oct. 1985).
Schematic Diagram for Tektronix Power Supply.

Primary Examiner—Leo H. Boudreau
Assistant Examiner—Michael Razaus
Attorney, Agent, or Firm—Douglas H. Lefeve

[57] ABSTRACT

A very efficient and compact circuit is provided to power an electroluminescent panel as may be used for back lighting liquid crystal displays in portable computers. The capacitance of the electroluminescent panel is incorporated in a series resonant, self-commutating power oscillator. The power oscillator is powered by a DC-to-DC converter and inherently provides the desired sinusoidal output waveform to the reactive load comprising the capacitance of the electroluminescent panel.

11 Claims, 2 Drawing Sheets

POWER SUPPLY FOR ELECTROLUMINESCENT PANEL

This is a continuation of application Ser. No. 014,894 filed Feb. 13, 1987, now abandoned.

TECHNICAL FIELD

This invention relates generally to electrical power conversion and more particularly to a technique for very compactly powering a load such as that realized in flat light sources such as electroluminescent panels which are used for backlighting liquid crystal displays in portable computers.

BACKGROUND ART

In recent years a number of manufacturers have introduced portable and highly compact personal computers. While the technology associated with integrated circuit packaging has advanced to the point that a great deal of processing function can be packaged into a small, portable unit, the display devices which have typically been used with these portable computers have had significant limitations associated therewith.

The most commonly used display technology for these laptop computers has been the liquid crystal display, or LCD. In an LCD the characters are formed by selectively darkening areas of a relatively transparent sheet. In the simplest form of these displays, which are seen daily in electronic watches and clocks, as well as in laptop computers, a flat panel of reflective material is positioned behind this relatively transparent sheet in which the darkened images are formed. Thus, the user is able to perceive these images by seeing the contrast between the light reflected back through the non-darkened areas of the transparent sheet and the darkened areas where light is not reflected.

This simplest form of LCD technology is adequate in many instances, particularly in those environments in which the ambient lighting level is high enough that adequate light is available for transmission through the relatively transparent layer to the reflective surface and back through the relatively transparent layer to the viewer's eyes. This explains the phenomenon which is observed by users of this display technology, that the brighter the ambient light, the easier it is to read the images formed on the display device.

Thus, in environments in which the ambient light is not particularly high, the LCD device becomes difficult to read. This problem involves numerous considerations. The comfort level which needs to be provided to the user relates to how intensive the use of the display is to be. That is, the purchaser of a low cost wrist watch may well be satisfied with not being able to see the digits on the wrist watch as clearly in low light environments, because it involves little added difficulty to look at the watch longer to correctly perceive the relatively few digits being considered. Additionally, since the LCD display on a wrist watch is small, the problem has often been reduced by providing a tiny incandescent light bulb at one edge of the display which is adequate to light the display for quick viewing.

The problem of poor visibility of LCDs in low light environments is a highly significant one for the larger LCDs used in laptop computers. These devices are typically large enough to display in excess of twenty lines of text having eighty characters each. They are often viewed for extended periods of time, so it is not feasible to ignore the additional eye strain. A single, or even a great plurality of incandescent light bulbs along the edges of the display will not provide an even enough light source to adequately and uniformly light the entire display area. Additionally, the electrical power requirement for a large incandescent array would effectively render the computer non-portable.

As a solution to the problem of providing a light source for the large LCD used in laptop computers, the reflective panel behind the relatively transparent layer has been replaced by an electroluminescent panel which is powered by a substantially high voltage alternating current source. One representative model of such an electroluminescent panel requires around 140 volt RMS at a frequency of about 700 Hertz. Higher frequencies than this shorten the life of the electroluminescent panel as do wave shapes which are not substantially sinusoidal.

The IBM PC Convertible is a laptop personal computer which offers an LCD having no supplmental lighting capability. The word "convertible" in its product name is descriptive of the feature that the LCD may be readily detached from the laptop computer when it is desired to interface the computer to a different display, such as a cathode ray tube (CRT), when such a display is available and it is not necessary to rely on the internal batteries of the computer.

In providing an LCD which is backlighted with an electroluminescent panel as an option for such a computer, the problem arises of how to provide the relatively high voltage to the electroluminescent panel. Other laptop computers having liquid crystal displays supplementally lighted by electroluminescent panels have included the high voltage power supplies for these panels in the main, system unit portion of the laptop computer. Since their displays are not detachable there has been no safety problem in providing the high voltage in the system unit and conveying it to the display device through a suitably insulated conductor. In fact, a suitably insulated connector could be provided to allow the safe detachment of the display if such a connector were being designed into the system from the beginning. However, in the case of the IBM PC Convertible, the system unit without the high voltage power supply and the low voltage connector are an existing configuration. It would be highly advantageous to be able to allow users of this product the additional advantages of an LCD having supplemental lighting without the requirement to also purchase a new system unit.

Previous circuits packaged in system units of laptop computers to power electroluminescent panels in LCDs have utilized relatively large magnetic components including a transformer operating in a push-pull, parallel resonant circuit. Such a circuit was not adaptable to packaging within the separable LCD enclosure of the system described above having the detachable display. Attempts to size reduce the prior art circuits through the use of exotic magnetic core materials were unsuccessful in achieving enough size reduction to allow packaging within the detachable LCD enclosure so that the same system unit and connector thereon could be used with an improved display having an electroluminescent panel backlighting.

It would, therefore, be highly advantageous to provide a circuit to power the electroluminescent panel for a backlighted LCD with the circuit being packaged with the display itself, rather than needing to be remotely mounted.

SUMMARY OF THE INVENTION

Accordingly, the reactive load represented by the capacitance of an electroluminescent lighting panel, such as has been used to backlight an LCD, is powered by means of a series resonant, self-commutating power oscillator. The power oscillator is configured to provide an appropriate, substantially sinusoidal voltage to the electroluminescent panel at an appropriate frequency without the use of large magnetic components, as have been used in prior art circuits for powering such panels.

The power oscillator is driven by a DC-to-DC converter since the DC voltage required to drive the power oscillator is substantially greater than the DC voltage typically available in devices such as laptop computers which utilize LCDs backlighted by electroluminescent panels. The output voltage of the DC-to-DC converter is adjustable to ultimately provide for a variety of lighting intensities at the electroluminescent panel. The use of this circuit configuration allows the entire power supply for the electroluminescent panel to be contained within a compact housing in which an LCD panel, detachable from a laptop personal computer, is contained. This enables a backlighted LCD to be retrofitted to such a laptop personal computer without any modification to the personal computer, such as inclusion of the electroluminescent panel power supply within the personal computer and replacement of the electrical connector on the personal computer through which power to the LCD is conveyed.

The foregoing and other objects, features, extensions, and advantages of the invention will be apparent from the following more particular description of a preferred embodiment of the invention, as illustrated in the accompanying drawing.

DESCRIPTION OF THE PREFERRED EMBODIMENT

Figure 1:
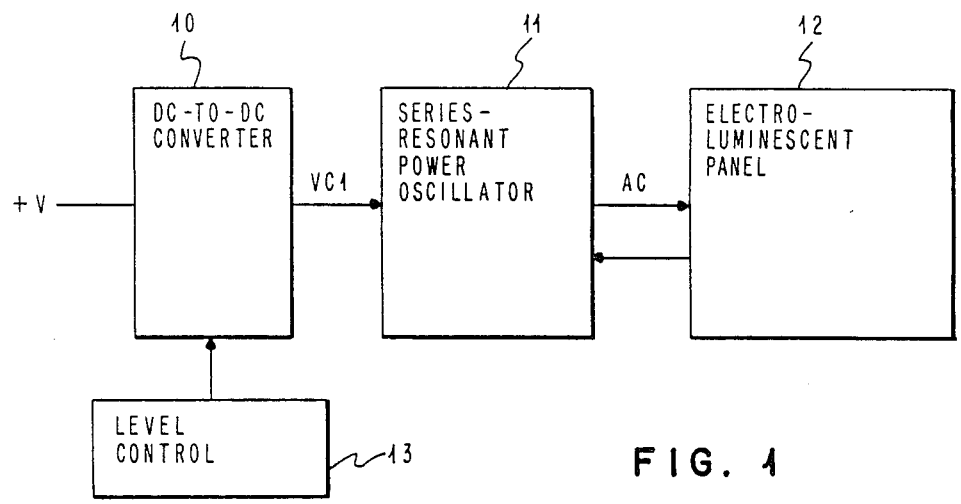
FIG. 1 is a block diagram of the major component elements of the power supply of this invention.

Referring now to FIG. 1, a block diagram of an adjustable level, highly efficient power supply for driving the capacitive load represented by an electroluminescent panel for a battery powered, portable computer product is shown. The power supply comprises the two primary components of an adjustable DC-to-DC converter and a series resonant power oscillator.

In FIG. 1, the DC-to-DC converter 10 receives a relatively low DC voltage from a battery power supply of a portable personal computer. The converter 10 converts this relatively low DC voltage to a substantially higher DC voltage for application to the series resonant power oscillator 11. The power oscillator 11 includes, in its series resonant circuit, the electroluminescent lighting panel 12, itself. Additionally, connected to the DC-to-DC converter 10 is an intensity control 13 which allows the output voltage of the converter 10 to be varied which, in turn, controls the intensity of the lighting panel 12. The relatively low DC voltage applied to the converter 10 may also be derived from a low voltage AC-to-DC converter which is typically used with portable, battery powered products when they are near AC power to avoid unnecessary battery drain.

Figure 2:
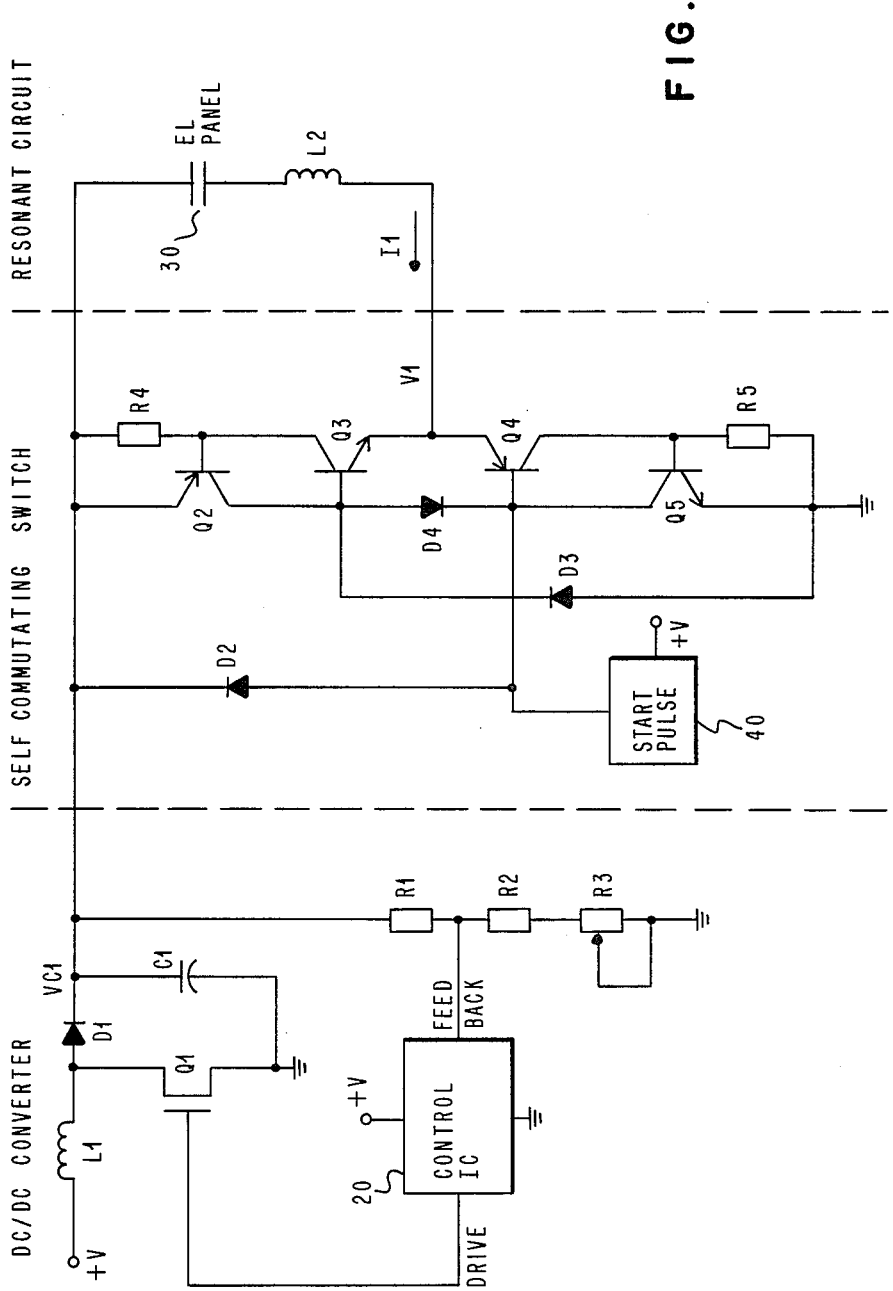
FIG. 2 is a detailed schematic diagram of the circuitry depicted by elements of the power supply in FIG. 1.

In FIG. 2, a detailed schematic diagram of the circuitry of this invention is shown. A positive voltage V, which is obtained from batteries or other suitable low voltage, DC source is applied to an inductor L1. Initially, the switching device Q1 is in an ON state which causes V to be across the inductor L1. This causes a flow of current through, and energy storage in, the inductor L1. During this time a diode D1 blocks conduction from a capacitor C1 to the inductor L1 while the switching device Q1 is in the ON state.

At a time determined by the control circuit 20, the switching device Q1 is turned off. At this time the energy stored in the inductor L1 causes the voltage at the anode of the diode D1 to rise, which causes conduction of the diode D1 and transfer of energy stored in the inductor L1 to the capacitor C1. Repetition of this cycle maintains voltage across the capacitor C1 at a level higher than V. An adjustable voltage divider consisting of resistors R1, R2, and R3 causes the control circuit 20 to switch the device Q1 with an appropriate duty cycle to cause the voltage at the capacitor C1 to maintain a desired value.

Any of a number of commercially available control circuits may be used for the control circuit 20, including the Unitrode 1843 Off-Line Current Mode Pulse Width Modulation Controller or the Texas Instruments TL494 Switchmode Pulse Width Modulation Control Circuit.

Those skilled in the art will note that a variety of DC-to-DC converter designs may used for the above-described portion of this circuit, it being required only that an efficient means be provided to increase a DC voltage to a level higher than that made available by a typical, low voltage battery supply.

The self commutating switching and resonant circuit form an oscillator which operates from the potential across the capacitor C1. The electroluminescent panel is represented in this circuit as a capacitance 30. The capacitance 30 of the electroluminescent panel is in series with an inductor L2. Together, this capacitance 30 and inductor L2 form a series resonant circuit which will ring upon the existence of any current flow in these series resonant components.

Figure 3:
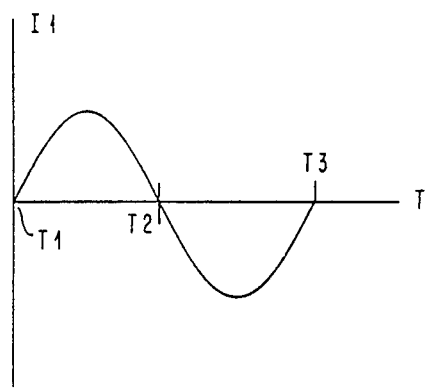
FIG. 3 the waveform of the current flowing out of the inductor of the series resonant circuit of the oscillator of the power supply of this invention.

For an analysis of the self commutating switch and resonant circuit which form the power oscillator circuit, assume that the resonant circuit formed by the inductor L2 and the capacitance 30 of the electroluminescent panel is in a state of oscillation. In addition to FIG. 2, reference is also made to FIG. 3, which shows the sinusoidal wave form of the current I1 which flows through this resonant circuit. At time T1 when I1 becomes a positive value, the voltage V1 at the emitters of transistors Q3 and Q4 rises above the voltage VC1 (across capacitor C1) causing current flow through the base-emitter junction of transistor Q4 and through the diode D2. This current flow causes transistor Q4 to turn on which provides base current to transistor Q5. This causes transistor Q5 to also turn on which provides additional base current to transistor Q4.

The regenerative effect of this connection of transistors Q4 and Q5 causes both devices to saturate, thereby forming a latching circuit. Since both of these transistors are saturated, the voltage V1 decreases to near ground level. This has the effect of putting capacitor C1 in series with the resonant circuit and causes energy transfer from capacitor C1 into the resonant circuit while the current I1 is positive. The energy delivered from capacitor C1 to the circuit is what overcomes losses in the circuit and is used by the circuit in producing light from the electroluminescent panel.

At time T2, when the current I1 becomes negative, the combination of transistors Q4 and Q5 no longer has a source of current to maintain them in a conductive state and, therefore, becomes an open circuit. The current I1 flows in the opposite direction through the base-emitter junction of the transistor Q3 from the diode D3. Current flow through transistor Q3 causes transistor Q2 to turn on and the regenerative action of the combination of transistor Q2 and Q3 form a latching circuit similar to the Q4-Q5 transistor combination. During the time between T2 and T3, the voltage V1 is forced to be near VC1 which causes the capacitor C1 to be out of the series resonant circuit and prevents energy from being returned to the capacitor C1 during the negative half cycle of the current I1. At time T3 the current I1 again becomes positive and the cycle repeats itself, as described above beginning at time T1.

The diode D4 prevents simultaneous conduction of transistors Q3 and Q4 and thus, prevents extraneous noise from causing simultaneous conduction in both latching circuits. The resistors R4 and R5 prevent transistors Q2 and Q5 from being turned on by leakage currents from transistors Q3 and Q4.

To start the oscillation of this circuit, a starting pulse in supplied by the start pulse generator 40 which may, for example, comprise a monostable multivibrator circuit, known in the art as a "one-shot". The starting pulse from circuit 40 is applied to the base of transistor Q4 which causes transistor Q4 to conduct and begin the initial, self-commutating action of the circuit.

Energy is consumed during each cycle of the resonant circuit due to both heat losses and light output from the circuit. The current I1 in the oscillator will seek a level such that the losses in each complete cycle will equal the energy received from the capacitor C1 during the positive half of the cycle. Accordingly, by adjusting the voltage VC1, the energy transfer and current level I1 may be varied to produce the desired light output from the panel.

In summary, a very efficient and compact circuit has been shown to power a load such as the capacitance of an electroluminescent panel which may be used for back lighting liquid crystal displays in portable computers. Fundamental to this efficient power conversion device is the use of the capacitive load in a series resonant, self-commutating power oscillator. The power oscillator inherently provides the desired sinusoidal output waveform. Those skilled in the art will recognize that, while the invention has been described relative to the application of powering an electroluminescent lighting panel, the circuit may be readily utilized in other applications in which it is desirable to efficiently power a substantially reactive load.

While the invention has been shown and described with reference to particular embodiments thereof, it will be understood by those skilled in the art that the foregoing and other changes in form and details may be made therein without departing from the spirit and scope of the invention.

We claim:

1. A circuit for powering an electroluminescent panel of a display device, wherein said circuit receives a low DC voltage and said panel requires at least an order of magnitude higher AC voltage, comprising:
    means for increasing said low DC voltage to a higher DC voltage; and
    self commutating power oscillator means including said panel and an inductor in a series resonant circuit for receiving said higher DC voltage and directly generating and providing said AC voltage to said panel without any transformer.

2. The circuit of claim 1 wherein said means for increasing said low DC voltage to a higher DC voltage comprises a DC-to-DC converter.

3. The circuit of claim 2 wherein said converter includes means for adjusting the higher DC output voltage thereof for varying said AC voltage delivered to said electroluminescent panel by said oscillator.

4. The circuit of claim 2 wherein said oscillator comprises a first pair of latching devices connected to supply DC power to said series resonant circuit during a first half of the period of said AC voltage.

5. The circuit of claim 4 wherein said oscillator comprises a second pair of latching devices connected to short circuit said series resonant circuit during a second half of the period of said AC voltage.

6. The circuit of claim 5 wherein each of said pairs of latching devices comprises a pair of transistors.

7. The circuit of claim 5 wherein said converter comprises a single ended boost converter.

8. A method of powering an electroluminescent panel of a detachable display device, wherein said detachable display device receives a low DC voltage and said panel requires at least an order of magnitude higher AC voltage, comprising:
    powering a DC-to-DC converter by said low DC voltage to provide a higher DC voltage; and
    powering a self commutating oscillator by said higher DC voltage;
    said steps of powering including connecting, without use of any transformer, said panel in series with an inductor within said oscillator to form a series resonant circuit to which an AC voltage from said oscillator is generated and directly delivered.

9. The method of claim 8 additionally comprising providing an adjustable output voltage from said DC-to-DC converter for varying said higher DC voltage thereof to vary said AC voltage delivered to said electroluminescent panel.

10. The method of claim 9 additionally comprising connecting a first pair of latching devices to supply said higher DC voltage to said series resonant circuit during a first half of the period of said AC voltage.

11. The method of claim 10 additionally comprising connecting a second pair of latching devices connected to short circuit said series resonant circuit during a second half of the period of said AC voltage.

* * * * *

UNITED STATES PATENT AND TRADEMARK OFFICE
CERTIFICATE OF CORRECTION

Page 1 of 6

PATENT NO. : 4,859,911
DATED : August 22, 1989
INVENTOR(S) : J.R. KINNARD et al

It is certified that error appears in the above-identified patent and that said Letters Patent is hereby corrected as shown below:

ON TITLE PAGE: "11 claims" should read --9 claims--.

Column 6;

CLAIM 1, line 4, after "higher" insert -- , substantially continuous, --;

line 10, after "said" insert -- substantially continuous --;

line 11, after "transformer" delete the period "." and add -- , said power oscillator means having a first end of said series resonant circuit connected to said higher DC voltage and a second end of said series resonant circuit connected by a first latching means to a reference potential for transferring energy to said series resonant circuit during a first half of the period of said substantially continuous AC voltage and a

UNITED STATES PATENT AND TRADEMARK OFFICE
CERTIFICATE OF CORRECTION

Page 2 of 6

PATENT NO. : 4,859,911
DATED : August 22, 1989
INVENTOR(S) : J.R. KINNARD et al

It is certified that error appears in the above-identified patent and that said Letters Patent is hereby corrected as shown below:

second latching means connected from said first end of said series resonant circuit to said second end of said series resonant circuit for short-circuiting said series resonant circuit during a second half of the period of said substantially continuous AC voltage, said first and second latching means being automatically switched in response to current flow into and out of said second end of said series resonant circuit. --.

CLAIM 3, line 3, before "AC" insert -- substantially continous --.

UNITED STATES PATENT AND TRADEMARK OFFICE
CERTIFICATE OF CORRECTION

PATENT NO. : 4,859,911
DATED : August 22, 1989
INVENTOR(S) : J.R. KINNARD et al

It is certified that error appears in the above-identified patent and that said Letters Patent is hereby corrected as shown below:

CLAIMS 4 and 5, delete the claims in their entirety.

CLAIM 6, renumber claim 6 as claim 4; and line 1, after "claim" change "5" to -- 3 --; and delete "pairs of";

line 2, after "latching" delete "devices comprises a pair of transistors." and replace with -- means comprise a PNP transistor and an NPN transistor, with a collector of said PNP transistor connected to a base of said NPN transistor and with a collector of said NPN transistor connected to a base of said PNP transistor. --.

CLAIM 7, renumber claim 7 as claim 5; and line 1, after "claim" change "5" to -- 3 --.

UNITED STATES PATENT AND TRADEMARK OFFICE
CERTIFICATE OF CORRECTION

PATENT NO. : 4,859,911
DATED : August 22, 1989
INVENTOR(S) : J.R. KINNARD et al

It is certified that error appears in the above-identified patent and that said Letters Patent is hereby corrected as shown below:

CLAIM 8, renumber claim 8 as claim 6; and line 4, before "AC" insert -- substantially continous --;

line 10, change "steps" to -- step --; and after "powering" insert -- said self commutating oscillator --;

line 13, after "circuit" insert a -- ; -- and delete the rest of the line;

line 14, delete all of the line and replace with -- connecting a first end of said series resonant circuit to said higher DC voltage and a second end of said series resonant circuit through a first latching means to a reference potential for transferring energy to said series resonant circuit during a

UNITED STATES PATENT AND TRADEMARK OFFICE
CERTIFICATE OF CORRECTION

PATENT NO. : 4,859,911
DATED : August 22, 1989
INVENTOR(S) : J.R. KINNARD et al

It is certified that error appears in the above-identified patent and that said Letters Patent is hereby corrected as shown below:

first half of the period of said substantially continuous AC voltage; connecting a second latching means from said first end of said series resonant circuit to said second end of said series resonant circuit for short circuiting said series resonant circuit during a second half of the period of said substantially continuous AC voltage; and automatically switching said first and second latching means in response to current flow into and out of said second end of said series resonant circuit. --.

UNITED STATES PATENT AND TRADEMARK OFFICE
CERTIFICATE OF CORRECTION

PATENT NO. : 4,859,911
DATED : August 22, 1989
INVENTOR(S) : J.R. KINNARD et al

It is certified that error appears in the above-identified patent and that said Letters Patent is hereby corrected as shown below:

CLAIM 9, renumber claim 9 as claim 7; and line 1, after "claim" change "8" to -- 6 --;

line 4, before "AC" insert -- substantially continous --.

CLAIMS 10 and 11, delete the claims in their entirety.

Signed and Sealed this

Tenth Day of November, 1992

Attest:

DOUGLAS B. COMER

Attesting Officer

Acting Commissioner of Patents and Trademarks